United States Patent [19]
Ito et al.

[11] Patent Number: 6,115,191
[45] Date of Patent: Sep. 5, 2000

[54] ZOOM LENS BARREL EMPLOYING A DRIVE CAM FOR MOVING LENS GROUPS

[75] Inventors: Takeshi Ito, Hino; Shigeo Hayashi, Okaya, both of Japan

[73] Assignee: Olympus Optical Co., Ltd., Tokyo, Japan

[21] Appl. No.: 09/089,976

[22] Filed: Jun. 3, 1998

[30] Foreign Application Priority Data

Jun. 9, 1997 [JP] Japan ..... 9-151328
Apr. 15, 1998 [JP] Japan ..... 10-105003

[51] Int. Cl.[7] ..... G02B 15/14
[52] U.S. Cl. ..... 359/699; 359/700
[58] Field of Search ..... 359/694, 699, 359/700, 701, 823

[56] References Cited

U.S. PATENT DOCUMENTS 5,376,983  12/1994  Yamazaki et al. ..... 354/195.12
5,687,029  11/1997  Omi et al. ..... 359/700

Primary Examiner—Georgia Epps
Assistant Examiner—Ricky Mack
Attorney, Agent, or Firm—Ostrolenk, Faber, Gerb & Soffen, LLP

[57] ABSTRACT

A zoom lens barrel that performs zooming by moving a plurality of lens groups, which constitute a photo-taking optical system, by interlocking the lens groups with each other. The zoom lens barrel includes a first frame supporting a first lens group, and a second frame supporting a second lens. A cam tube supports both the first frame and the second so that the frames can relatively move in the direction of the optical axis of the optical system. A drive cam is provided in the cam tube and has a cam that has a first cam region for moving the first frame in the direction of the optical axis and a second cam region for moving the second frame in the direction of the optical axis. The drive cam is formed so that the first and the second frame may commonly use partial regions of the first cam region and the second cam region at the time of performing the zooming.

13 Claims, 11 Drawing Sheets

FIG.12A *PRIOR ART*
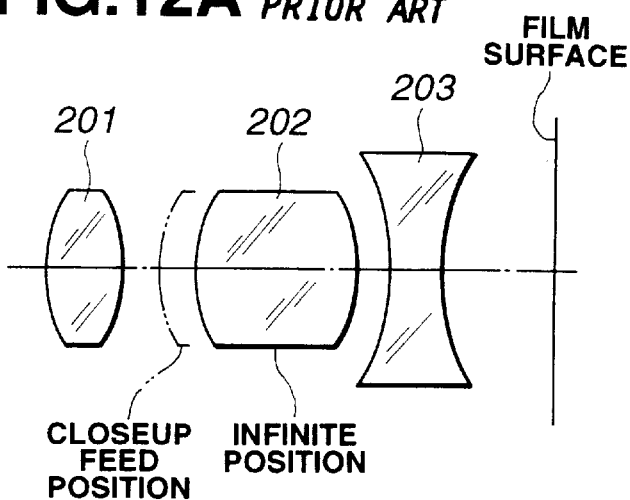
FIG.12B *PRIOR ART*
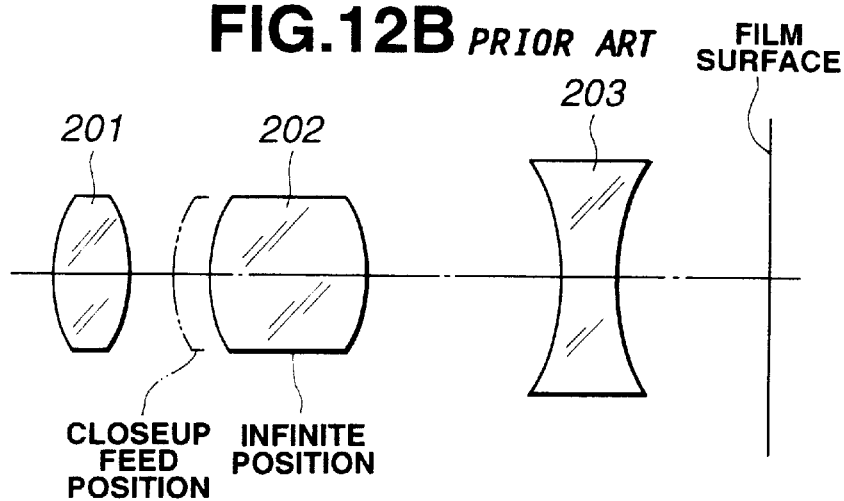
FIG.12C *PRIOR ART*
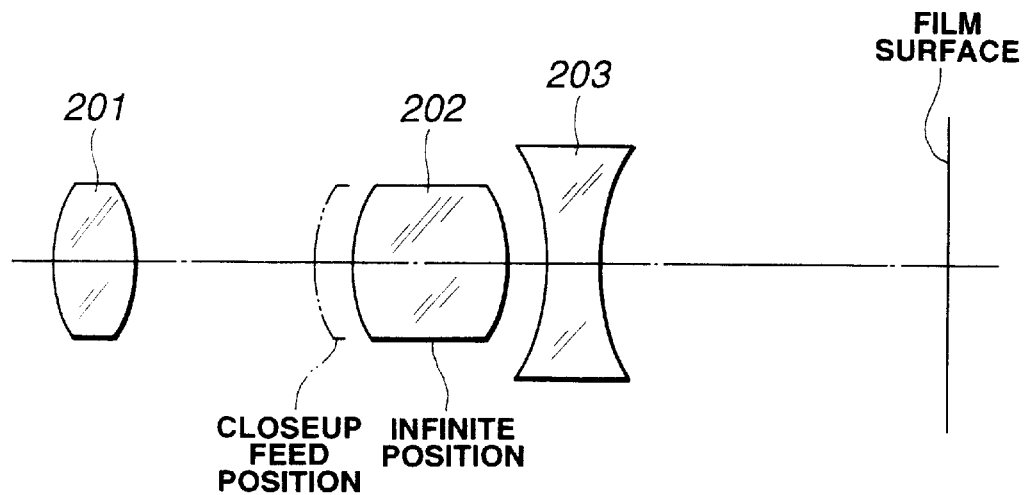

ZOOM LENS BARREL EMPLOYING A DRIVE CAM FOR MOVING LENS GROUPS

BACKGROUND OF THE INVENTION

1. Field of the Invention

The present invention relates to a lens barrel, and in particular, to the construction for miniaturizing a zoom lens barrel having a lens barrel capable of advancing and retreating.

2. Related Art Statement

In a zoom lens barrel in which a plurality of lens groups including a focus lens group is made to move in the direction of an optical axis and to perform zoom operation, cam grooves for driving different lens groups that separately advance and retreat respectively are separately formed according to respective movements.

In addition, in such a lens barrel, advance of the focus lens group is performed using the infinite position as a datum, and in case of focusing in the vicinity, focusing is performed by advancing the focus lens group from the infinite position to a closeup position.

FIGS. 12A, 12B, and 12C show a zoom lens whose phototaking lens is composed of three groups of lenses, and show an example of a tube-retraction type of zoom lens barrel in which the second lens group is a focus lens. FIG. 12A is an explanatory diagram showing positions of respective lens groups in a tube retracting state. FIG. 12B is an explanatory diagram showing positions of respective lens groups in a wide-angle state. FIG. 12C is an explanatory diagram showing positions of respective lens groups in a telescopic state.

As shown in FIGS. 12B and 12C, when the zoom lens barrel is in the wide-angle state and telescopic state, the second lens group (focus lens group) 202 is usually positioned at the infinite position shown by solid lines in the figure against the first and third lens group 201 and 203. In addition, focusing to the vicinity is performed by advancing the second lens group 202 from the infinite position to the closeup position in the first lens group side that is shown by alternate long and two short dashes lines. After photo-taking, the second lens group 202 is moved to the infinite position by being reset.

Furthermore, a method for containing this zoom lens barrel at a tube retracting position after photo-taking is as follows. As shown in FIG. 12A, the second lens group 202 is not moved from the infinite position, that is, the second lens group 202 keeps the state being reset at the infinite position. On the other hand, with keeping the distance between the first lens group 201 and second lens group 202 and moving them as one piece, the entire length of the lens barrel is shortened and the lens barrel is contained by shortening a zoom distance between the first lens group 201 and third lens group 203. Therefore, when the tube retraction is completed space remains for closeup feeding length of the focus lens group.

In conventional cam grooves for movement of lens groups, it is difficult to sufficiently secure movable ranges of respective lens groups because a plurality of cam grooves are provided on the same circumferential surface of the same cam tube.

Thus, if a plurality of different cam grooves are formed adjacent to each other, rotation angles of the cam grooves become small, and thus increase the pressure on each cam groove when the cam tube rotates. If the diameter of the cam tube is made to be large so as to reduce this pressure, the lens barrel becomes correspondingly large. In addition, if cam grooves are formed shifted to the thrust direction lest respective cam grooves should overlap without the cam grooves being adjacent to each other, the entire length of the cam tube becomes large. Hence, the lens barrel also becomes large in this case.

In this manner, using respective cam grooves separately causes a malfunction that the entire size of the lens barrel becomes large in radial directions or in the thrust direction.

Furthermore, as described above, when the zoom lens barrel is retracted, a surplus space for closeup feeding length of the focus lens group is kept in the front of the focus lens group. As a consequence, the entire length of the lens barrel at the tube retraction becomes large.

Moreover, in a lens barrel shown in FIGS. 12A to 12C, if a cam for tube retraction is provided by extending a zoom cam moving the first lens group 201 for zooming so as to shorten the distance between the first lens group 201 and second lens group 202 for the sake of reducing the entire length of the lens barrel, this causes additional difficulty of cam layout in the cam tube and enlargement of the cam tube.

In addition, since the first lens group 201 that is a zoom lens is moved so as to shorten the distance between the first lens group 201 and second lens group 202, the load for electrically driving the cam tube becomes large.

OBJECTS AND SUMMARY OF THE INVENTION

A first object of the present invention is to provide a zoom lens barrel with which movable ranges of respective lens groups can be sufficiently secured without enlarging a cam tube even if it is necessary to form a plurality of cam grooves on the same circumferential surface of the same cam tube.

In addition, a second object of the present invention is to provide a zoom lens barrel wherein a focus lens group is fed forward before tube retracting operation, and the tube retracting operation is performed thereafter, thereby shortening the entire length of the zoom lens barrel in the tube retraction.

In brief, a zoom lens barrel of the present invention that performs zooming by moving a plurality of lens groups in a photo-taking optical system with interlocking them with each other includes:

a frame supporting a first lens group;

a frame supporting a second lens group;

a cam tube supporting the frame supporting the first lens group and the frame supporting the second lens group so that the frames supporting the lens groups can move in the direction of the optical axis; and a drive cam means that is provided in the cam tube and has a cam that has the first cam region for moving the frame supporting the first lens group in the direction of the optical axis and the second cam region for moving the frame supporting the second lens group in the direction of the optical axis and is formed so that the frame supporting the first lens group and the frame supporting the second lens group may commonly use partial regions of the first cam region and the second cam region at the time of performing the zooming.

These objects and advantages of the present invention will become further apparent from the following detailed explanation.

BRIEF DESCRIPTION OF THE DRAWINGS

FIG. 12A is an explanatory diagram showing the positional relation of respective lenses of a conventional zoom lens barrel in the tube retracting state.

FIG. 12B is an explanatory diagram showing the positional relation of respective lenses of a conventional zoom lens barrel in the wide-angle state.

FIG. 12C is an explanatory diagram showing the positional relation of respective lenses of a conventional zoom lens barrel in the telescopic state.

DESCRIPTION OF THE PREFERRED EMBODIMENTS

Embodiments of the present invention will be described with reference to drawings.

Figure 1:
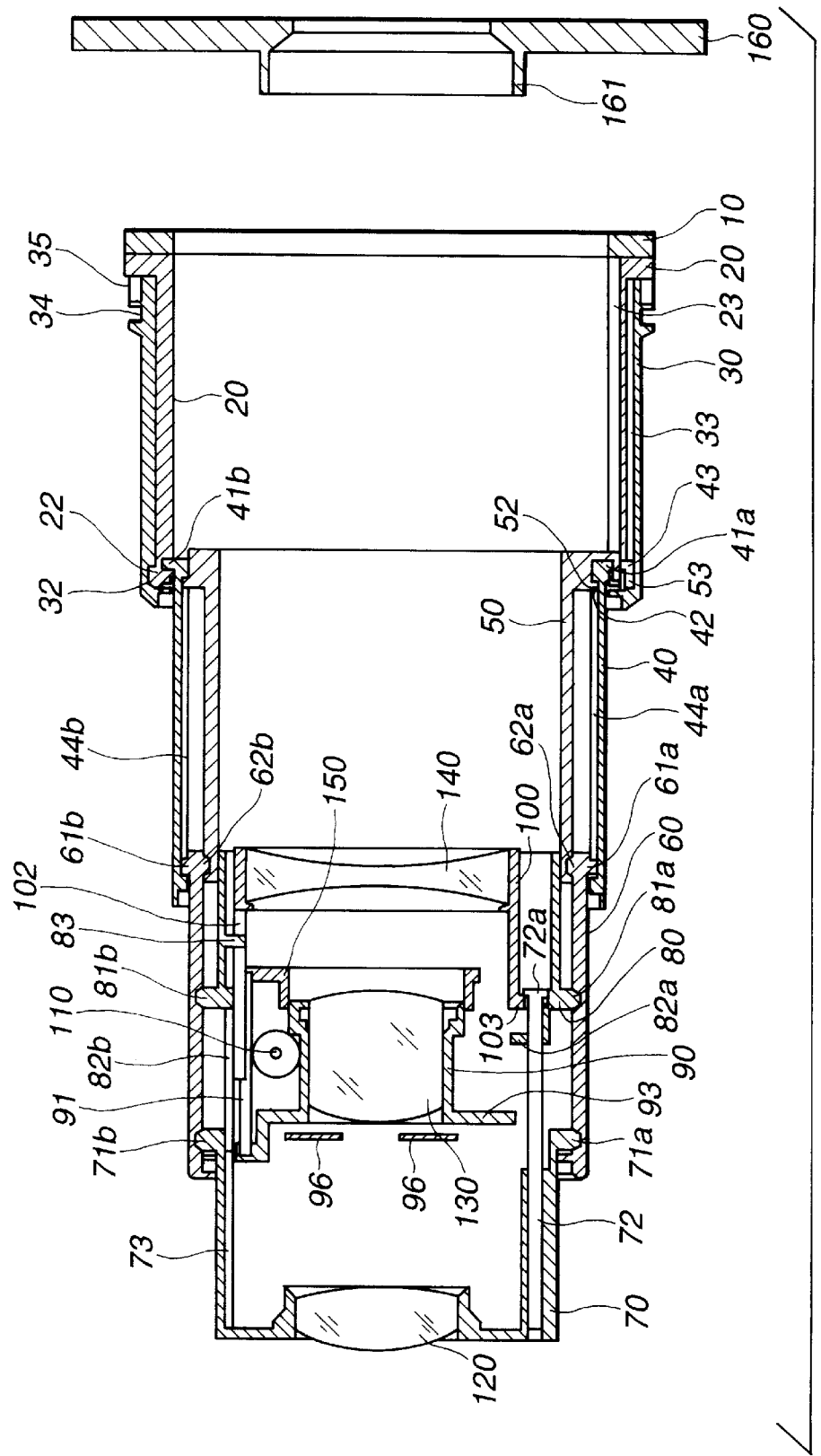
FIG. 1 is a cross-sectional diagram showing a zoom lens barrel of an embodiment according to the present invention in which the zoom lens barrel is in a telescopic state.
Figure 2:
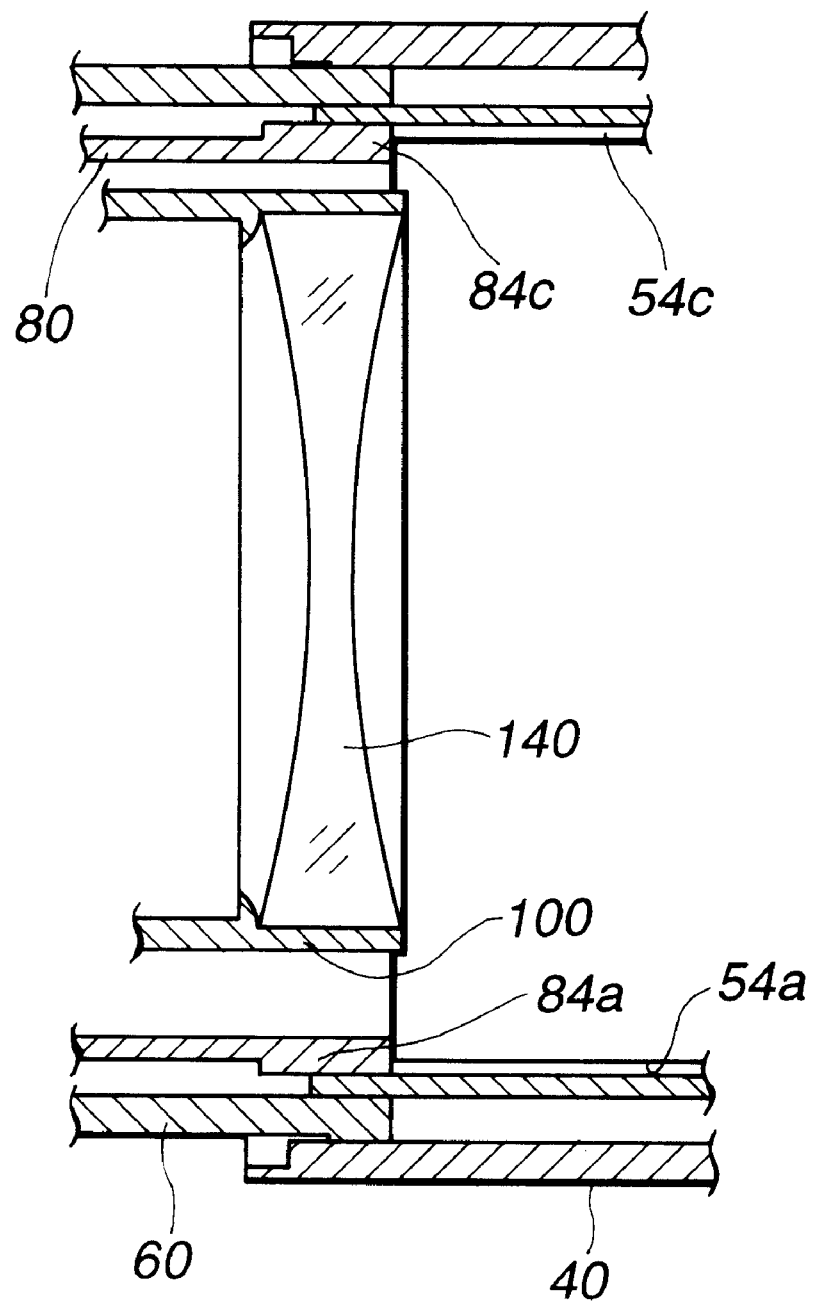
FIG. 2 is a cross-sectional diagram of a fitting portion where the first cam tube and a zoom tube of the zoom lens barrel shown in FIG. 1 are fitted.
Figure 3:
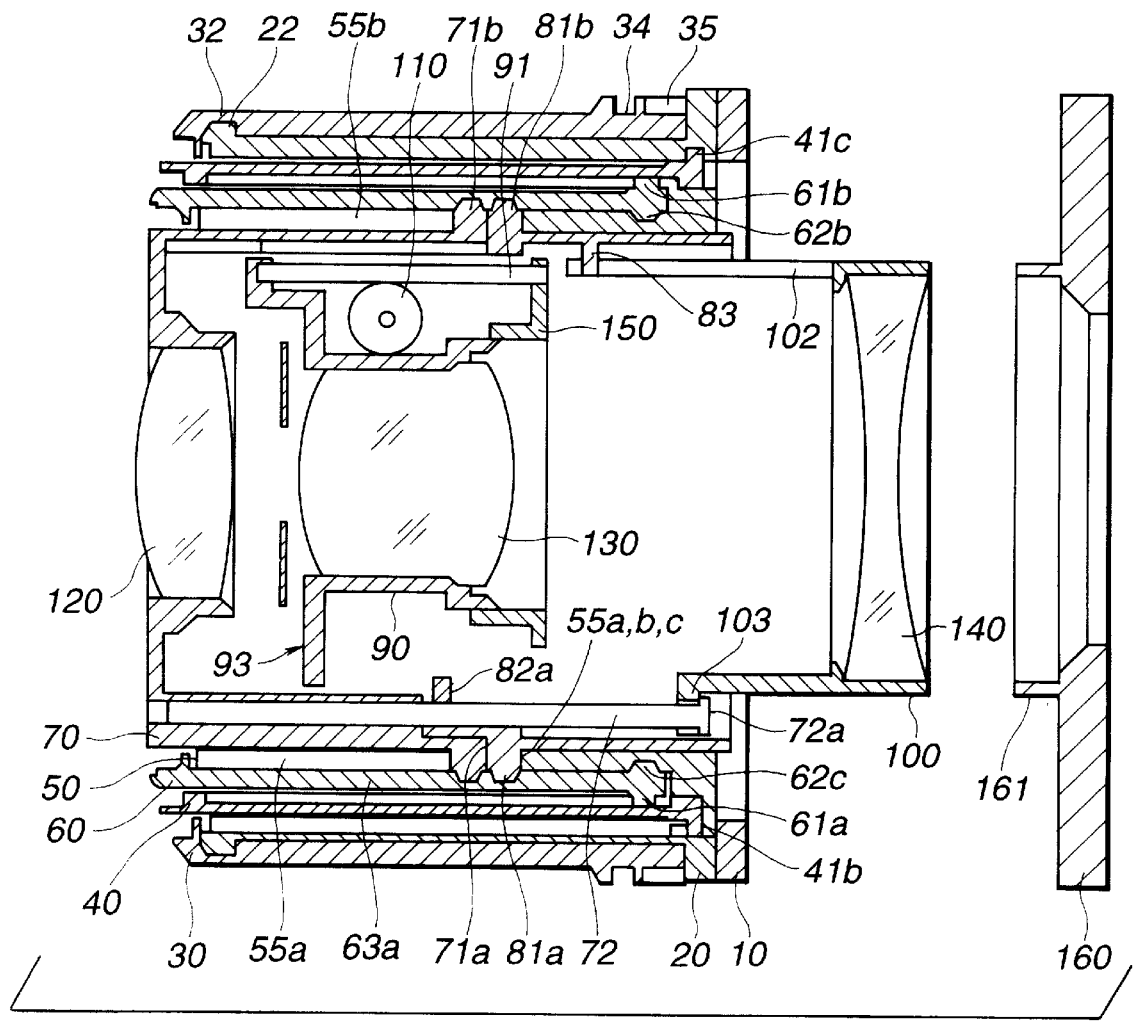
FIG. 3 is a cross-sectional diagram showing the zoom lens barrel shown in FIG. 1 in which the zoom lens barrel is in a wide-angle state.
Figure 4:
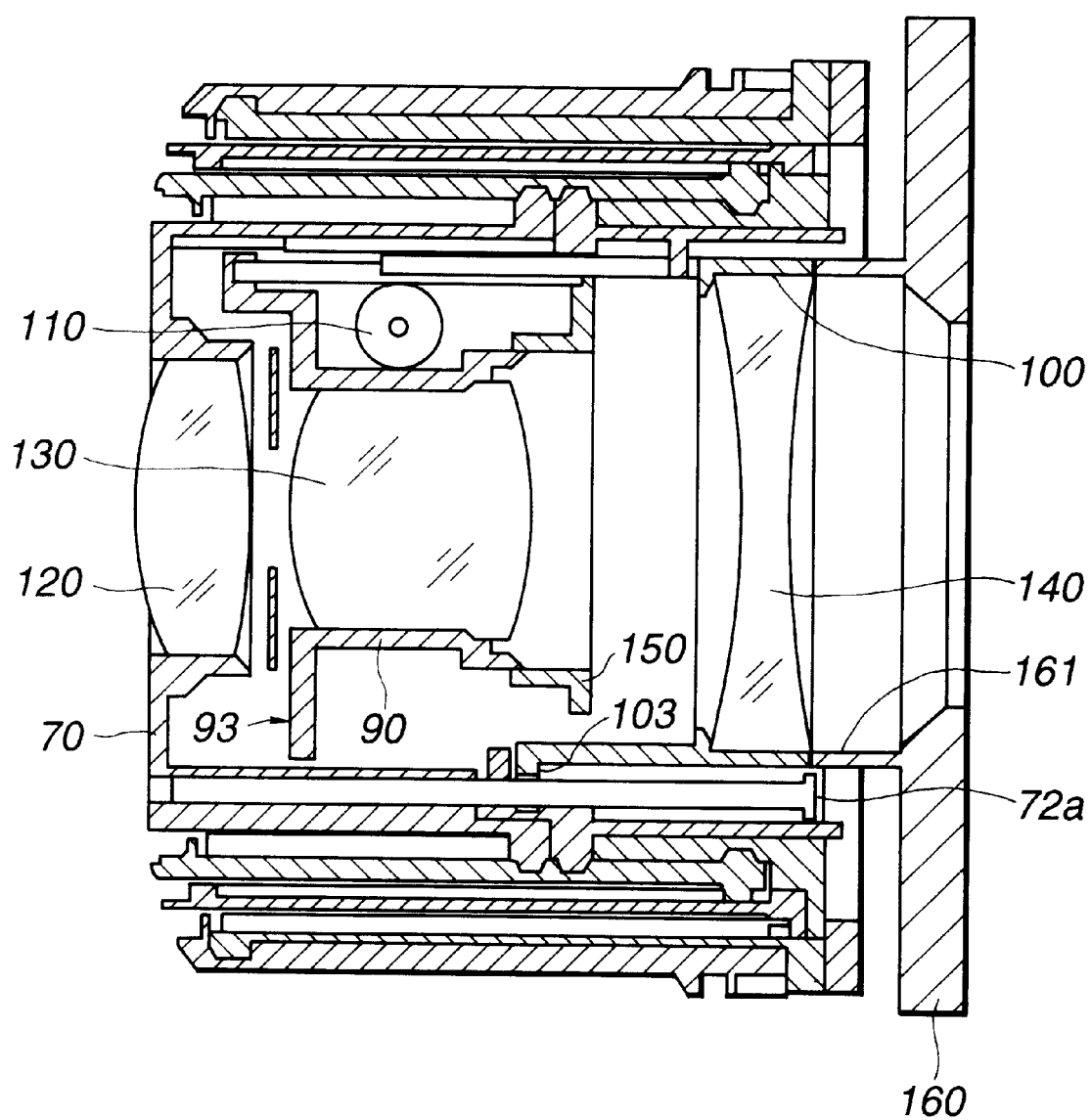
FIG. 4 is a cross-sectional diagram showing the zoom lens barrel shown in FIG. 1 in which the zoom lens barrel in a tube retracting state.
Figure 5:
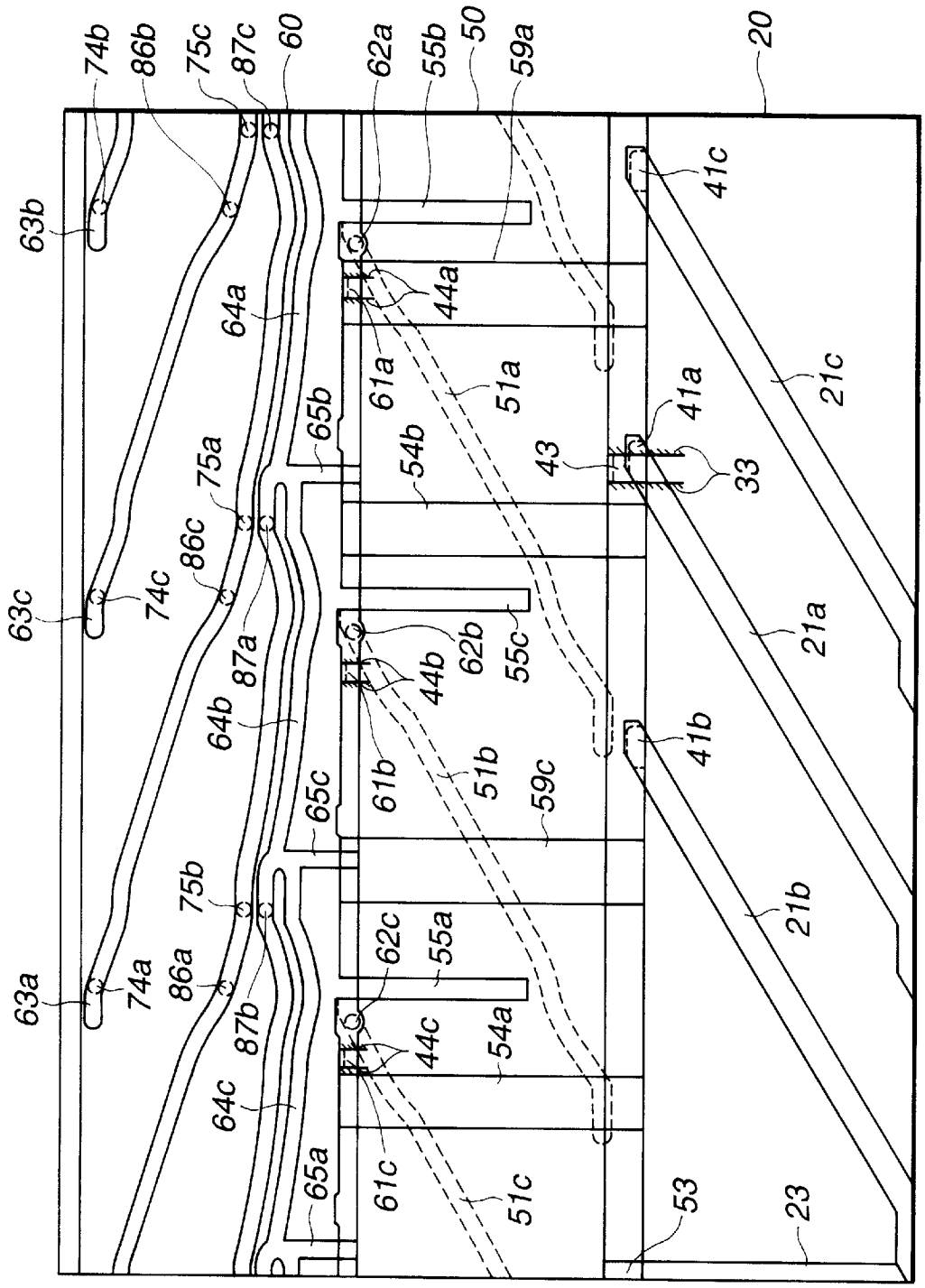
FIG. 5 depicts the shapes of cam grooves in a moving tube, the first cam tube, and the second cam tube of the zoom lens barrel that is shown in FIG. 1 and is set in the telescopic state.
Figure 6:
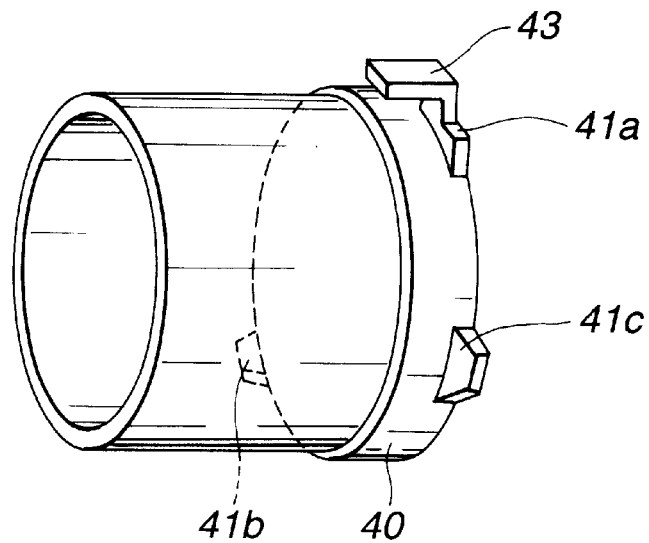
FIG. 6 is a schematic diagram of a main part of a guide tube included in the zoom lens barrel shown in FIG. 1.
Figure 7:
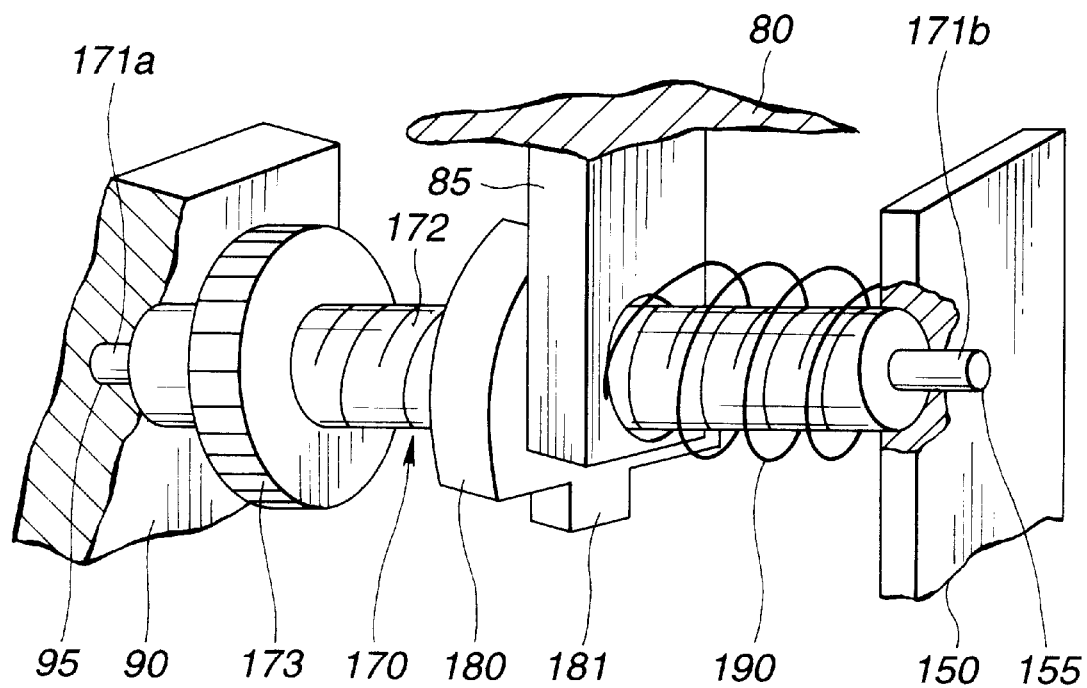
FIG. 7 is a schematic diagram showing a feed screw mechanism for performing the focusing of the zoom lens barrel.

FIGS. 1 to 8 relate to an embodiment of the present invention. FIG. 1 is a cross-sectional diagram showing a zoom lens barrel according to the present invention in which the zoom lens barrel is set in a telescopic state. The optical axis of the zoom lens barrel is used as the center of the cross-section so that a necessary section can be seen. FIG. 2 is a cross-sectional diagram of a main part of the zoom lens barrel showing only the vicinity of a fitting portion where the first cam tube and a zoom tube of the zoom lens barrel shown in FIG. 1 are fitted. FIG. 3 is a cross-sectional diagram showing the zoom lens barrel shown in FIG. 1 in which the zoom lens barrel is set in a wide-angle state. The optic axis is again used as the center of the cross-sectional view. FIG. 4 is a cross-sectional diagram showing the zoom lens barrel shown in FIG. 1 in which the zoom lens barrel is set in a tube retracting state. FIG. 5 depicts the shapes of cam grooves in a moving tube, the first cam tube, and the second cam tube of the zoom lens barrel that is shown in FIG. 1 and is set in the telescopic state. FIG. 6 is a schematic diagram of a main part of a guide tube included in the zoom lens barrel shown in FIG. 1. FIG. 7 is a schematic diagram showing a feed screw mechanism for performing the focusing of the zoom lens barrel. FIG. 8A is a graph explaining a design method of rotation angles and feed amounts of respective tubes in the zoom lens barrel. Finally, FIG. 8B is a graph explaining a design method of an angular position and a feed amount of the second cam tube in the zoom lens barrel.

As shown in FIGS. 1 to 4, the zoom lens of this embodiment includes:

a first lens group 120;

a second lens group 130; and a third lens group 140.

The first 120 and second lens groups 130 move as one piece during zooming. These lens groups are held by a first group tube 70, a second group tube 90, and a third group tube 100 respectively. The second lens group 130 is a focus lens group, and is held by the second group tube 90. This second group tube 90 is further held by a zoom tube 80. In addition, focusing is performed by the zoom tube 80 and second group tube 90 relatively moving through feeding by a known feed screw.

A zoom lens barrel includes:

a moving tube 20 that is a reference tube that can advance and retreat against a camera body 160 to a tube retracting position that is a containing position and a projecting position where photo-taking can be performed;

a rotating tube 30 that is an outer tube for zooming that is rotatable against the moving tube 20;

a guide tube 40 that is rotationally driven by the rotating tube 30 and is moved back and forth by a cam of the moving tube 20;

a first cam tube 50 that is guided by the moving tube 20 and is driven back and forth with the guide tube 40 simultaneously without rotating;

a second cam tube 60 that is guided by the guide tube 40 in regard to the direction of rotation and is driven back and forth by a cam of the first cam tube 50;

a zoom tube 80 that is guided by the first cam tube 50 and is driven back and forth by a cam of the second cam tube 60;

a first group tube 70 that supports the first lens group 120, is guided by the zoom tube 80, and is driven back and forth by a cam of the second cam tube 60;

a second group tube 90 that is supported so that the tube 90 can move back and forth against the zoom tube 80 and supports the second lens group 130; and a third group tube 100 that is supported by the zoom tube 80 and supports the third lens group 140.

The end of the camera body 160 includes a projecting section 161 that contacts the base of the third group tube 100 at the time of tube retraction and has a diameter approximately identical to that of the third group tube 100.

A moving plate 10 is fixed with screws and the like in the base of the moving tube 20. This moving plate 10 is supported by the camera body 160 so that the plate 10 can move back and forth in the direction of the optical axis and cannot rotate. A well-known drive mechanism (not shown) having a setup motor is provided on the moving plate 10. In addition, when the moving plate 10 is driven by this drive mechanism, the moving tube 20 moves back and forth with the moving plate 10 as one piece between the tube retracting position and projecting position.

The rotating tube 30 is rotatably provided on the outer circumferential surface of the moving tube 20. A thrust block groove 32 is formed in the inner circumference of the end of this rotating tube 30. A thrust block lip 22 that is formed toward the outside in the end of the moving tube 20 is fitted to this thrust block groove 32. This configuration regulates the relative movement of the rotating tube 30 in the thrust direction against the moving tube 20.

A gear section 35 for performing zooming by transferring motive power from a zoom motor (not shown) is formed in part of the outer circumferential surface of the rotating tube 30 that is near to its base.

Furthermore, a thrust block groove 34 is formed adjacent to the end of the gear section 35 in part of the outer circumferential surface of the rotating tube 30 that is near to its base. Since a bayonet type of thrust block (not shown) that is formed in the camera body 160 can be freely fitted in this thrust block groove 34, the rotating tube 30 fits in the bayonet type of thrust block by rotating. This bayonet type of thrust block is fitted when the zoom lens barrel is at the projecting position, and is released when the zoom lens barrel is retracted.

The guide tube 40 fits in the inner circumferential surface of the moving tube 20. On part of the outer circumferential surface of this guide tube 40 that is near to its base, as shown in FIG. 6, cam pins 41a, 41b, and 41c are formed with projecting to the outside. These cam pins 41a, 41b, and 41c are fitted in a slant cam slot 21a, and slant cam grooves 21b and 21c (see FIG. 5) that are formed at predetermined intervals in the inner circumferential surface of the moving tube 20. In addition, the cam grooves 21b and 21c are formed in cam grooves having bottoms, the cam slot 21a is formed in a through hole.

A rotational drive pin 43 is formed in the end of the cam pin 41a (see FIG. 6). This rotational drive pin 43 is projected from the cam slot 21a toward the outer circumference of the moving tube 20, and is fitted in a rotational drive keyway 33 that is formed along the direction of the optical axis in the inner surface of the rotating tube 30. Therefore, when the rotating tube 30 rotates, the guide tube 40 is also rotated and also moves back and forth in the direction of the optical axis along the cam slot 21a and cam grooves 21b and 21c of the moving tube 20.

The first cam tube 50 is provided on the inner circumferential surface of the guide tube 40. In the base of this first cam tube 50, a guide key 53 is formed projecting toward the outside. This guide key 53 fits in a straight keyway 23 that is formed along the direction of the optical axis in the inner surface of the moving tube 20, and hence the first cam tube 50 is guided straight.

In addition, a thrust block lip 52 is formed in part of the outer circumference of the first cam tube 50 that is near to its base. This thrust block lip 52 is fitted bayonet style in a thrust block grove 42 formed in part of the inner circumferential surface of the guide tube 40 that is near to its base. The relative movement of the cam tube 50 against the guide tube 40 in the thrust direction is thus regulated. Therefore, the guide tube 40 and first cam tube 50 move back and forth as one piece in the direction of the optical axis, while also rotating.

Furthermore, in the cam tube 50, as shown in FIG. 5, relief slots 55a, 55b, and 55c, whose ends open in the end of the cam tube 50, are formed at equal intervals along the direction of the optical axis.

The second cam tube 60 is fitted in the inner circumferential surface of the guide tube 40 that is the outer circumferential surface of the first cam tube 50. Rotationally driven pins 61a, 61b, and 61c are formed on part of the outer circumferential surface of the second cam tube 60, which is near to its base, projecting toward the outside at 120° uniform intervals with the optical axis as the center. These rotationally driven pins 61a, 61b, and 61c are fitted respectively in rotational drive keyways 44a, 44b, and 44c that are formed along the direction of the optical axis in the inner surface of the guide tube 40.

In addition, in portions corresponding to rotationally driven pins 61a, 61b, and 61c on the inner circumferential surface of the second cam tube 60, cam pins 62a, 62b, and 62c are formed with projecting toward the inside. These cam pins 62a, 62b, and 62c are slidably fitted respectively in slant cam grooves 51a, 51b, and 51c (see FIG. 5) that are formed at equal intervals on the outer circumferential surface of the first cam tube 50. Therefore, when the guide tube 40 rotates, the second cam tube 60 rotates in synchronization with it, and moves back and forth in the direction of the optical axis along the slant cam grooves 51a to 51c of the first cam tube 50.

On the inner circumferential surface of the second cam tube 60, as shown in FIG. 5, slant cam grooves $63a_1$, $63a_2$, and $63a_3$ having a plurality of gently sloping bends are formed at equal intervals. Bases of these slant cam grooves $63a_1$, $63a_2$, and $63a_3$ communicate with each other through guide cam grooves during assembly, $63b_1$, $63b_2$, and $63b_3$. Furthermore, the bases communicate with ends of the cam grooves for insertion during assembly, $63c_1$, $63c_2$, and $63c_3$ that have openings in the base of the second cam tube 60.

The zoom tube 80 is provided in part of the inner circumferential surface of the second cam tube 60 that is near to its base, and the zoom tube 80 is fitted in the inner circumferential surface of the first cam tube 50. On part of the outer circumferential surface of this zoom tube 80 that is near to its base, antirotation keys 84a, 84b, 84c, and 84d (only the antirotation keys 84a and 84b are shown in FIG. 2) are formed projecting toward the outside at approximately 90° uniform intervals with the optical axis as the center. Furthermore, these antirotation keys 84a, 84b, 84c, and 84d are fitted respectively in straight keyways 54a, 54b, 54c, and 54d (see FIGS. 2 and 5) that are formed along the direction of the optical axis in the inner circumference of the first cam 50.

On the outer circumferential surface of the zoom tube 80, cam pins 81a, 81b, and 81c are formed projecting toward the outside at 120° uniform intervals with the optical axis as the center. Furthermore, these cam pins 81a, 81b, and 81c are fitted in the slant cams $63a_2$, $63a_3$, and 63a, respectively. Therefore, the zoom tube 80 advances and retreats in the direction of the optical axis along the slant cams $63a_2$, $63a_3$, and $63a_1$. In addition, the cam pins $81a_t$, $81b_t$, and $81c_t$, are positioned at 86a, 86b, and 86c in FIG. 5 in case of a telescopic state of the zoom lens barrel shown in FIG. 1.

In part of the inner circumferential surface of the second cam tube 60 that is near to its end, the first group tube 70 holding the first lens group 120 in its end is fitted. On part of the outer circumferential surface of this first group tube 70 that is near to its base, cam pins 71a, 71b, and 71c are formed with projecting toward the outside at 120° uniform intervals with the optical axis as the center. These cam pins 71a, 71b, and 71c are fitted in the slant cams $63a_1$, $63a_2$, and $63a_3$ respectively. Therefore, the first group tube 70 advances and retreats in the direction of the optical axis along the cams $63a_1$ to $63a_3$. In addition, the cam pins 71a, 71b, and 71c are positioned at $74a_t$, $74b_t$, and $74c_t$ in FIG. 5 in case of the telescopic state of the zoom lens barrel shown in FIG. 1.

Where the zoom lens barrel transfers from the telescopic state to the wide-angle state, the cam pins 71a, 71b, and 71c, and the cam pins 81b, 81c, and 81a enter the relief slots 55a, 55b, and 55c (see FIG. 3).

In the inner surface of the first group tube 70, an antirotation groove 73 is formed along the direction of the optical axis. A rotation stopper 82b that is formed with projecting in the end of the zoom tube 80 is keyjointed in this antirotation groove 73.

The end of the zoom shaft 72 is fitted in the wall of the first group tube 70. The base of this zoom shaft 72 engages the third group tube 100 through a bearing hole 82a provided in an inward flange that is formed in the end of the zoom tube 80. This zoom shaft 72 will be described in detail when the construction of the third group tube 100 is described.

Inside the zoom tube 80, the second group tube 90 holding the second lens group 130 is provided. On part of the outer circumferential surface of this second lens group 130 that is near to its base, a second group lip 150 is fitted, and a guide shaft 91 is supported by the second group tube 90 and second group lip 150. This guide shaft 91 is fitted in a bearing (not shown) that is formed in the zoom tube 80, and hence the second lens group 130 is supported so that the group 130 can move in the direction of the optical axis against the zoom tube 80.

On the outer circumferential surface of the second group tube 90, an antirotation pin (not shown) is formed. This antirotation pin is fitted in an antirotation groove (not shown) and is formed in the inner circumferential surface of the zoom tube 80. Hence, rotation of the second group tube 90 against the zoom tube 80 is regulated.

The end of the second group tube 90 is formed as a sector block surface 93, and this sector block surface 93 supports a sector 96. This sector 96 is driven by a plunger 110 that is an actuator for sector drive that is provided on the outer circumferential surface of the second group tube 90.

A feed screw mechanism is-provided on the second group tube 90, and performs focusing by relatively moving the second group tube 90 against the zoom tube 80 through driving the tube 90 in the direction of the optical axis.

The feed screw mechanism will be described with reference to FIG. 7.

The feed screw mechanism 170 comprises a screw shaft 172 whose rotation axis is in the direction of the optical axis. In both ends of this screw shaft 172, shanks 171a and 171b are formed. These shanks 171a and 171b are rotatable supported by bearing holes 95 and 155 that are formed in outward flanges of the second group tube 90 and second group lip 150 respectively.

A gear section 173 is fixed in the end of the screw shaft 172, and is engaged with a drive gear of a focus motor (not shown).

In part of the screw shaft 172 that is nearer to its base than the gear section 173, a male screw is formed. A nut 180 is screwed in this male screw. On the outer circumferential surface of this nut 180, an antirotation pin 181 is formed. This antirotation pin 181 is fitted in an antirotation groove (not shown) that is formed in the second group lip 150.

A part of the screw shaft 172 that is nearer to the base than the nut 180 is inserted into a through hole of the projecting section 85 that is formed inward in the inner circumferential surface of the zoom tube 80.

A compression spring 190 is provided in the outer circumference of the screw shaft 172 and between the projecting section 85 and second group lip 150. Then, owing to an energizing force of this compression spring 190, the projecting section 85 is forced into contact with the side of the base of the nut 180.

Returning to FIG. 1, the third group tube 100 holding the third lens group 140 is provided in part of the inner circumferential surface of the zoom tube 80 that is near to its base.

This third group tube 100 has a shank (not shown) which is inserted into a bearing that is formed in the zoom tube 80 (not shown) and is held so that the shank can freely move relatively against the zoom tube 80 in the direction of the optical axis.

An antirotation groove 102 is formed in the vicinity of the end of the third group tube 100. An antirotation pin 83 that is formed in the inner surface of the zoom tube 80 is fitted in this antirotation groove 102.

In the vicinity of the end of the third group tube 100, an outward flange is formed. The zoom shaft 72 is inserted into a thrust block hole 103 formed in this outward flange. In the end of the zoom shaft 72, a drop-off stopper 72a is formed so as to prevent the zoom shaft 72 from dropping off from the thrust block hole 103. In addition, an compression spring (not shown) is provided in the outer circumference of the zoom shaft 72 between the inward flange of the zoom tube 80 and the outward flange of the third group tube 100. This compression spring urges the third group tube 100 toward the base of the zoom tube 80.

Figure 9:
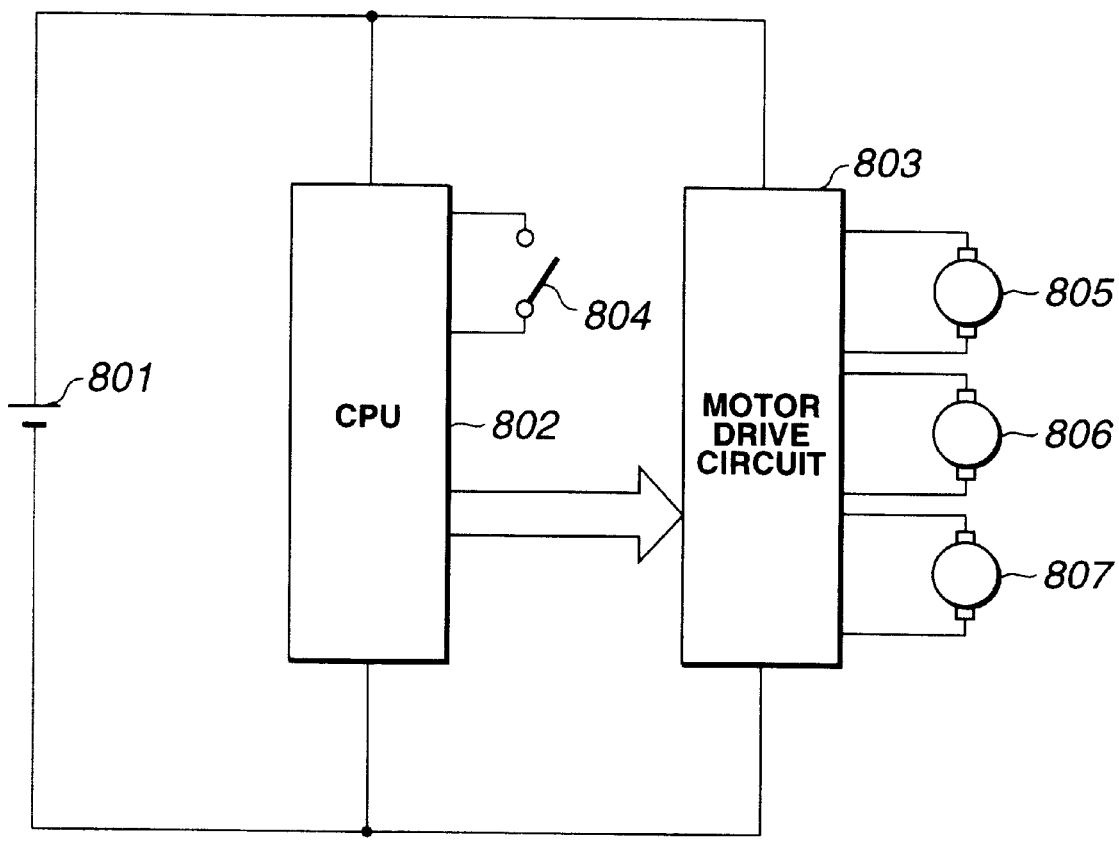
FIG. 9 is a block diagram showing a drive controller of the zoom lens barrel shown in FIG. 1.

The zoom lens barrel is driven and controlled by, for example, a drive controller shown in FIG. 9.

As seen in FIG. 9, the main part of this drive controller comprises a CPU 802, a motor drive circuit 803 that is connected to the CPU 802 through a signal line and supplies drive power to a plurality of drive motors, 805, 806, 807 on the basis of a drive signal from this CPU 802, and a battery 801 that is further connected to the CPU 802 and the motor drive circuit 803 and supplies power to them.

A main switch 804 of a camera, a plurality of switches (not shown), sensors, a photo-interrupter, a photoreflector and the like (not shown) are connected to the CPU 802. The CPU 802 performs sequence processing and the like on the basis of signals inputted from these devices, and outputs a drive signal to the motor drive circuit 803.

A focus motor 805, a zoom motor 806, and a setup motor 807 are connected to the motor drive circuit 803 as drive motors for the zoom lens barrel. When the drive signal is inputted from the CPU 802 to the motor drive circuit 803, the motor drive circuit 803 supplies drive power to the respective motors according to this drive signal. In addition, in this embodiment, three drive motors are used, but, in some cases of applied zoom lens barrels, it is also good to transfer its driving force respective driven sections by switching one or two drive motors mechanically or it is also good to use three or more drive motors.

Next, operation of the zoom lens barrel transferring from the telescopic state (see FIG. 1) to the wide-angle state (see FIG. 3) will be described.

The drive signal is inputted from the CPU 802 to the motor drive circuit 803, and the zoom motor 806 is activated on the basis of this drive signal. A rotational driving force from this zoom motor 806 is transferred to the gear section 35.

When the rotating tube 30 rotates toward the wideangle direction by this rotational driving force, the guide tube 40 rotates with the rotating tube 30 through the rotational drive pin 43 fitted in the rotational drive keyway 33 of the rotating tube 30 while retracting along the slant cam grooves (slot) 21a, 21b, and 21c. Concurrently, the first cam tube 50 retracts with the guide tube 40 as a one-piece under the condition of its rotation being regulated by the guide key 53 fitted in the straight keyway 23.

The rotational driving force of the guide tube 40 is transferred to the second cam tube 60 through the rotational driven pins 61a, 61b, and 61c fitted in the rotational drive keyways 44a, 44b, and 44c. Accordingly, this cam tube 60 rotates with the guide tube 40 as a one-piece while retracting along slant cams 51a, 51b, and 51c.

In addition, when the second cam tube 60 is rotated, the zoom tube 80 retracts by the cam pins 81c, 81b, and 81a fitted in the slant cam grooves $63a_1$, $63a_2$, and $63a_3$ under the condition of its rotation being regulated by the straight keyways 54a, 54b, 54c, and 54d of the cam tube 50. At the same time, the first group tube 70 retracts by the cam pins 71a, 71b, and 71c fitted in slant cams $63a_1$, $63a_2$, and $63a_3$ under the condition of its rotation being regulated by the rotation stopper 82b of the zoom tube 80.

The second group tube 90 simultaneously retracts with the zoom tube 80 as a one-piece. In addition, the third group tube 100 is always pressed toward the base of the zoom shaft 72 by a compression spring (not shown) that is provided between the inward flange of the zoom tube 80 and the outward flange of the third group tube 100, and hence the tube 100 retracts as a one-piece with the first group tube 70 holding the zoom shaft 72.

In this manner, zooming is performed by respective lens groups moving in the direction of the optical axis. Furthermore, a wide-angle position detection sensor (not shown) is provided in the zoom lens barrel. When this sensor detects a position just before the wide-angle position, this detection signal is sent to the CPU 802. The CPU 802 controls the zoom motor 806 on the basis of the detection signal, and stops the rotation of the rotating tube 30 at the timing when the lens barrel reaches the wide-angle position.

When the zoom lens barrel moves from the telescopic position to the wide-angle position, cam pins 71a, 71b, and 71c, and cam pins 81a, 81b, and 81c respectively move from positions shown by $74a_t$, $74b_t$, and $74c_t$, and $86a_t$, $86b_t$, and $86c_t$ in FIG. 5 to positions shown by $75a_w$, $75b_w$, and $75c_w$, and $87a_w$, $87b_w$, and $87c_w$.

Next, focusing of the zoom lens barrel will be described.

When the drive signal is inputted from the CPU 802 to drive circuit 803, the focus motor 805 is activated on the basis of this drive signal. The rotational driving force from this focus motor 805 is transferred to the gear section 173 (see FIG. 7), and the screw shaft 172 rotates.

Since the rotation of the nut 180 is stopped by the second group lip 150, the nut 180 advances and retreats in the direction of the optical axis according to the lead of the male screw of the screw shaft 172.

Since the projecting section 85 is pressed to the nut 180 by the compression spring 190, the second group tube 90 and the zoom tube 80 move together with the advance and retreat of the nut 180, and focusing is thus performed.

Next, the tube-retracting operation of the zoom lens barrel will be described.

First, by energizing the focus motor 805, the second group tube 90 is moved against the zoom tube 80, and is advanced by the forward closeup position. Thus, by reducing the space between the first lens group 120 and the second lens group 130 at its limit, a space for containing the third lens group 140 in the vicinity of the base of the second lens group 130 is formed.

Next, by energizing the zoom motor 806, the lens barrel is set in the wideangle state, and the zoom motor 806 is continuously driven into the direction of the wideangle position. Then, fitting of the thrust block groove 34 of the rotating tube 30 and the bayonet type of thrust block of the camera body 160 is disjointed.

Subsequently, by energizing the setup motor 807, the moving plate 10 and respective tubes are moved toward the tube retracting direction. Then the base of the third group tube 100 contacts to the projecting section 161 of the camera body 160, and the thrust block hole 103 of the third group tube 100 and the drop-off stopper 72a are disjoined. The third group tube 100 moves, compressing the compression spring (not shown) provided in the zoom shaft 72, and is contained in a space formed in the base side of the second lens group 130, and hence the zoom lens barrel occupies its shortest length, that is, in the tube retracting state.

In this manner, it becomes possible to shorten the entire length of the lens barrel in the tube retraction by advancing the focus lens group, that is, the second lens group 130 and providing the space in the base side of the second lens group 130.

Next, a sequence of the drive controller controlling the zoom lens barrel performing the tube retracting operation will be described.

Figure 10:
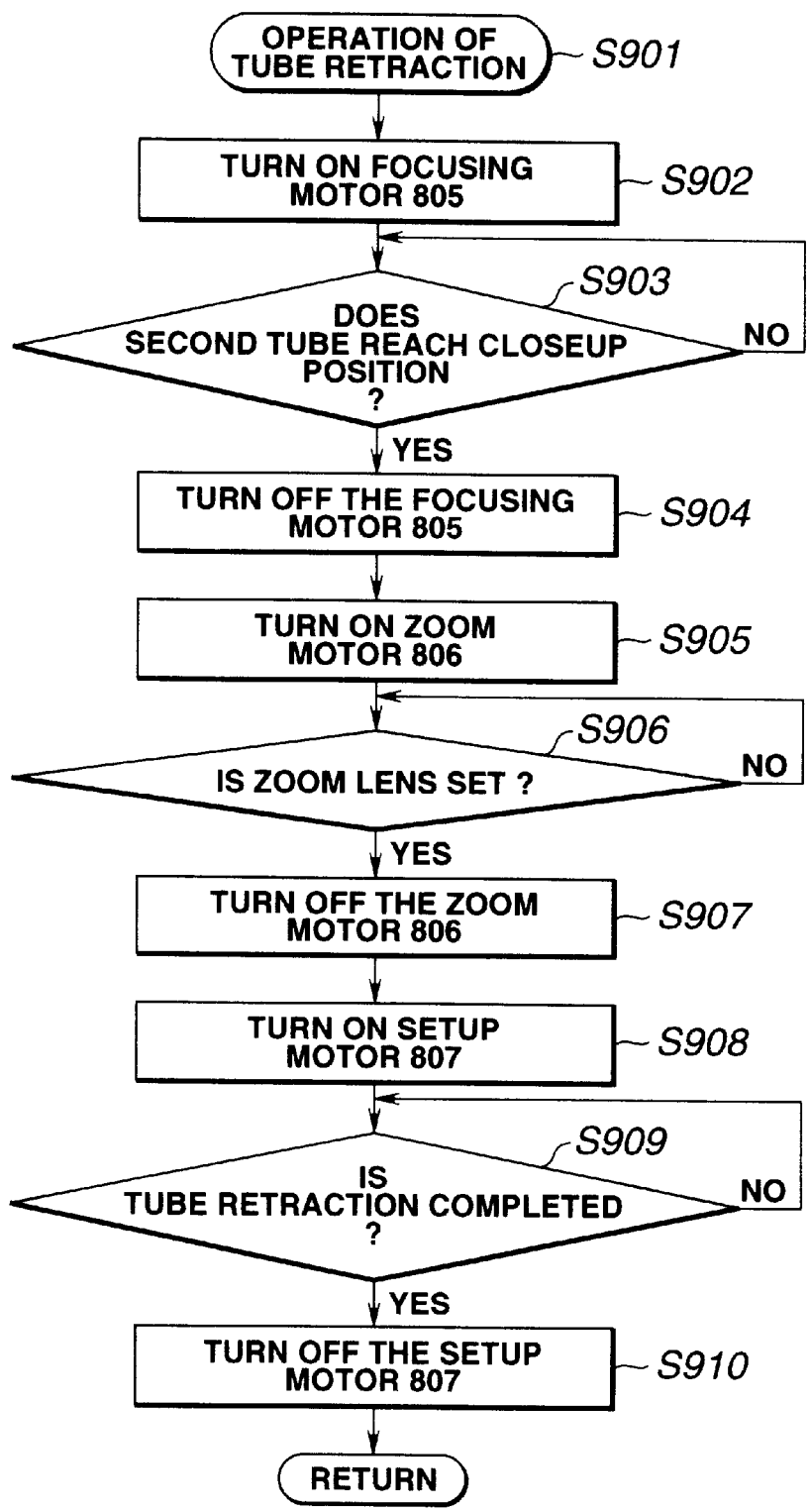
FIG. 10 is a flow chart showing a sequence performed by the drive controller shown in FIG. 9.

FIG. 10 is a flow chart showing the sequence of the drive controller when the zoom lens barrel performs the tube retracting operation.

In this embodiment, the zoom lens barrel starts the tube retracting operation by the instruction of the CPU 802 when the main switch 804 of the camera body that is connected to the CPU 802 is turned off. Thus, when the main switch 804 is turned off at step S901, the CPU 802 goes to step S902, outputs a predetermined signal to the motor drive circuit 803, drives the focus motor 805, and thereby activates the second group tube 90 to the closeup position.

Next, the CPU 802 goes to step S903, judges whether the second group tube 90 has reached the closeup position, proceeds to step S904 if it is determined that the tube 90 has reached the position, turns off energizing to the focus motor 805, and thereafter goes to step S905.

At the step S905, the CPU 802 activates the zoom lens barrel to the wide-angle direction by driving the zoom motor 806, and thereafter goes to step S906.

At the step S906, the CPU 802 determines whether the zoom lens barrel is in the wide-angle state and further the bayonet type of thrust block of the camera body 160 is disjointed from the thrust block groove 34 of the rotating tube 30. Here, if the CPU 802 determines that the bayonet type of thrust block is disjointed from the thrust block groove 34, the CPU 802 goes to step S907, and turns off the zoom motor 806.

Then, the CPU 802 goes to step S908, energizes the setup motor 807, thereby activates the moving plate 10 to the tube retracting direction, and thereafter goes to step S909.

At the step S909, the CPU 802 determines whether the moving plate 10 has completed moving to the tube retracting position, goes to step S910 if it is determined that the plate 10 has completed its motion, turns off the setup motor 807, and exits from the routine. Thus, the CPU 802 returns to the main routine for stopping camera operation.

In this manner, the tube retraction control of the drive controller is performed.

Figure 11:
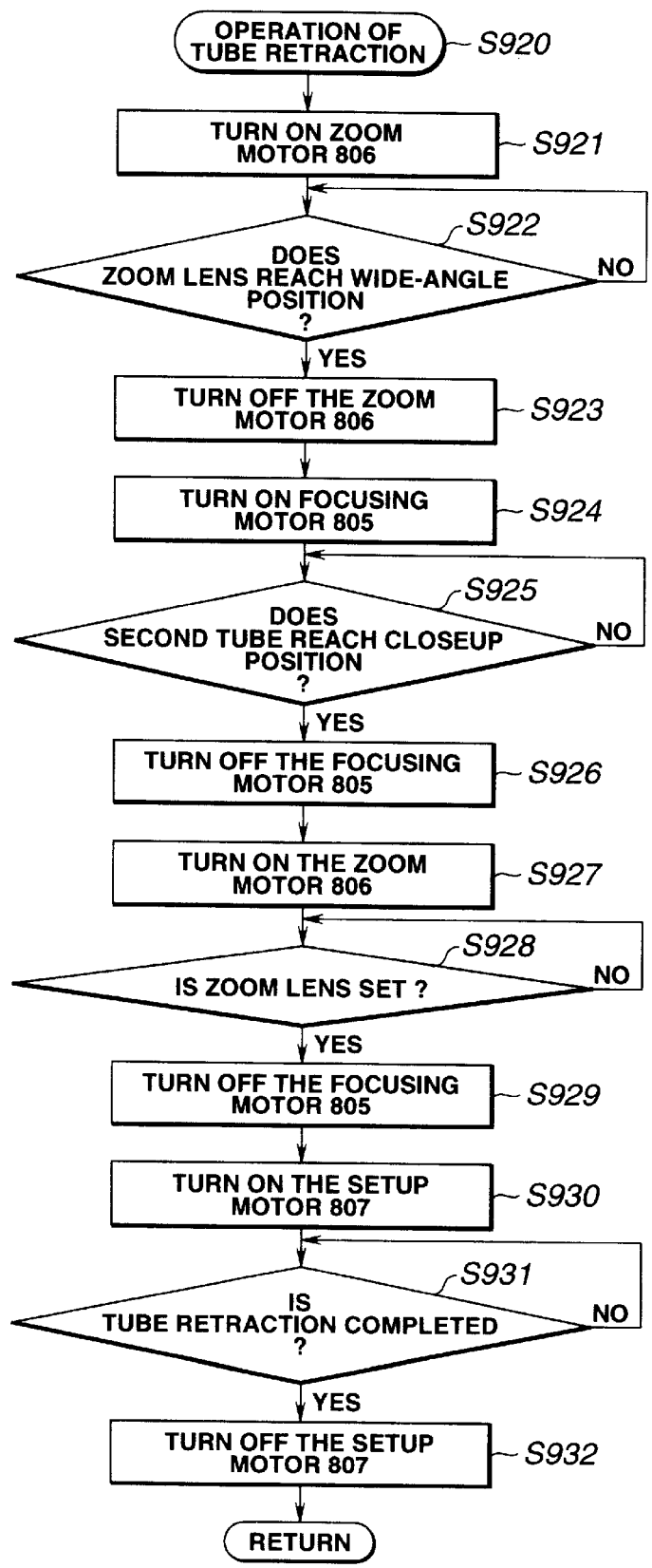
FIG. 11 is a flow chart showing another sequence performed by the drive controller shown in FIG. 9.

In addition, this tube retraction control of the drive controller can be also programmed according to the routine shown in FIG. 11.

FIG. 11 is a flow chart showing the sequence of the drive controller at the time when the zoom lens barrel retracts.

This control is different from the control method shown in FIG. 10 in that, before moving the second group tube 90 to the closeup position, the CPU 802 first sets the zoom lens barrel in the wide-angle state.

If the main switch 804 of the camera body that is connected to the drive controller is turned off at step S920, the CPU 802 goes to step 921, turns on the zoom motor 806, thereby activates the zoom lens barrel to move to the wide-angle position, and thereafter the CPU 802 goes to step S922.

At the step S922, the CPU 802 determines whether the zoom lens barrel has reached the wide-angle position, the CPU 802 goes to step S923 if it is determined that the zoom lens barrel has reached the position, and turns off the zoom motor 806.

Then, the CPU 802 goes to step S924, turns on the focus motor 805, thereby drives the second group tube 90 to the closeup position, thereafter goes to step S925.

The CPU 802 determines at the step S925 whether the second group tube 90 has reached the closeup position, goes to step S926 if it is determined that the tube 90 has reached the position, turns off the focus motor 805, and thereafter goes to step S927.

Hereinafter, since the control from the step S927 is the same as that from the step S910 shown in FIG. 10, description of them will be omitted.

In this manner, it is also possible to move the second group tube 90 to the closeup position after setting the zoom lens barrel in the wide-angle state and to drive the zoom motor 806 again.

In addition, the control methods shown in FIGS. 10 and 11 move the second group tube 90 to the closeup position that is the front when the second group tube 90 supporting the second lens group 202 is advanced at the time of the tube retraction. It, however, is also advantagous to feed the tube 90 to the closeup direction at a predetermined length with not always moving the tube to the closeup position.

Next, on the basis of the development of cams shown in FIG. 5, features of the slant cam groove 63a of the second cam tube 60 will be described.

The slant cam groove $63a_1$ of the second cam tube 60 comprises a cam groove portion that the cam pin 71a of the first group tube 70 uses between the wide-angle position $71a_w$ and the telescopic position $71a_t$ and a cam groove portion that the cam pin 81c uses between the wide-angle position $81c_w$ and the telescopic position $81c_t$.

In the cam groove $63a_1$, the cam groove between the wide-angle position $71a_w$ and the telescopic position $81c_t$ is not only a cam groove in the vicinity of the wide-angle position of the first group tube 70, but also a cam groove in the vicinity of the telescopic position of the zoom tube 80. Thus, one cam groove is commonly used by two different cam grooves for tube drive.

By commonly using one cam groove like this, it becomes possible to increase the flexibility of the cam groove layout, to shorten the entire length of the lens barrel, and to set a rotation angle large so that the pressure added to each cam groove is small even if the diameter of a tube is small.

Common use of a cam groove like this is possible in the case that zooming is performed by synthesizing two or more cam grooves.

Next, a design method of the slant cam groove 63a1 shown in FIG. 5 will be described with reference to two-dimensional graphs in FIGS. 8A and 8B.

Figure 8A:
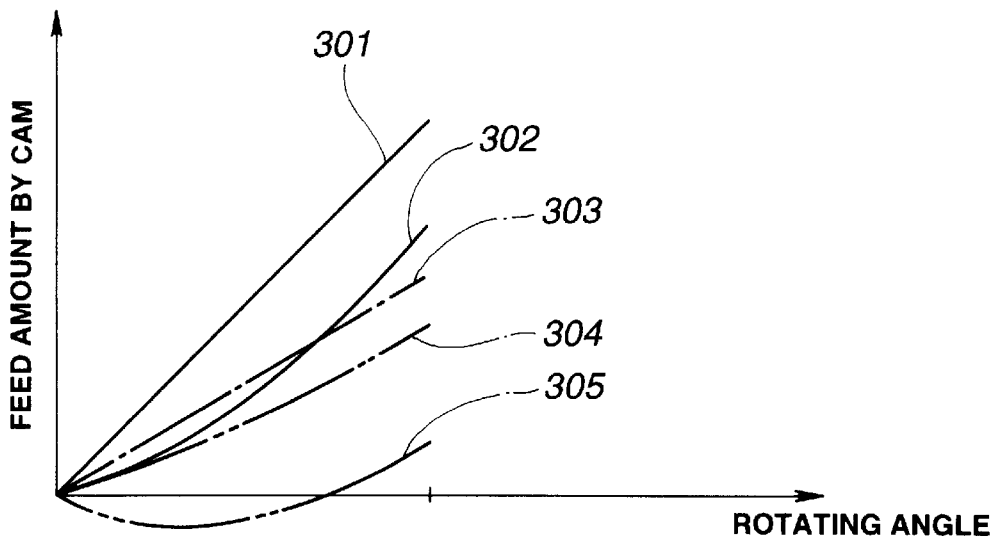
FIG. 8A is a graph explaining a design method of rotation angles and feed amounts of respective tubes in the zoom lens barrel.

These graphs show the case of designing the slant cam groove $63a_1$ to obtain a zoom lens barrel where feed amounts of two lens tubes, that is, the first group tube 70 and the zoom tube 80 (second group tube 90) against rotation angles have feed characteristics shown by 301 and 302 in FIG. 8A. In addition, it is assumed that the feed amount of the second cam tube 60 of this zoom lens barrel against the rotation angle linearly changes as shown by an alternate long and short dash line 303 in FIG. 8A.

In this case, cam grooves that are necessary for the second cam tube 60 to obtain the feed characteristics 301 and 302 and are for individually driving the first group tube 70 and the zoom tube 80 have shapes shown by alternate long and two short dashes lines 304 and 305 in FIG. 8A. The shapes are obtained by subtracting the feed amount 303 from the feed characteristics 301 and 302.

Figure 8B:
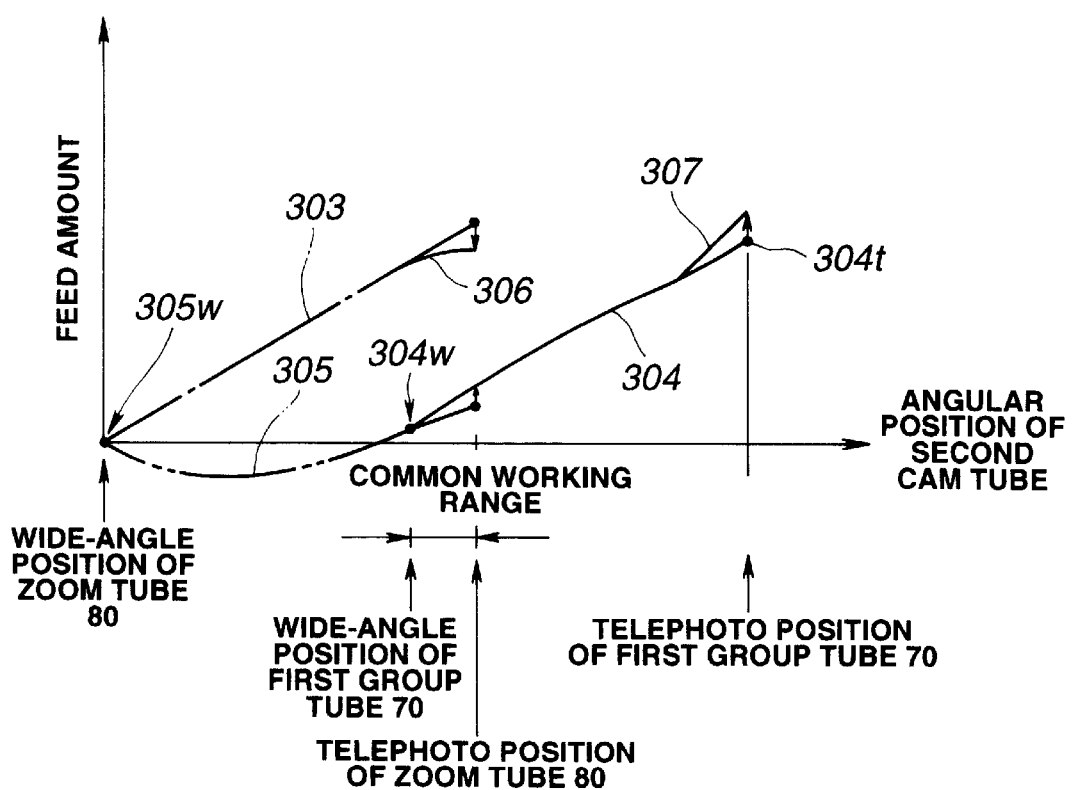
FIG. 8B is a graph explaining a design method of an angular position and a feed amount of the second cam tube in the zoom lens barrel.

Next, in order to commonly use part of the telescopic side of the cam groove 305 and part of the wide-angle side of the cam groove 304, as shown in FIG. 8B, the wide-angle position of the cam groove 304w is provided over the cam groove 305.

Then, a cam groove having a route of 305w–304w–304t as a cam groove synthesized from the cam grooves 304 and 305 is created. Since the first group tube 70 and zoom tube 80 move along this cam groove, each tube moves along the feed characteristics shown by 301 and 302 in FIG. 8A until the rotation angle 305w–304w.

Nevertheless, if the rotation angle exceeds 304w, the zoom tube 80 moves along the cam groove for the first group tube 70, and hence it is excessively advanced. Then, this is corrected by a feed amount of the second cam tube 60 (a first correction cam 306). In this time, feeding of the first group tube 70 becomes short by the first correction cam 306 of the second cam tube 60, and hence a partial cam groove for the first group tube 70 is corrected by the amount corresponding to the first correction cam (a second correction cam 307). Thus, the first correction cam 306 corrects a group space between the first lens group 120 and the second lens group 130, and the second correction cam 307 corrects a displacement caused by this correction, that is, a displacement between the entire lens, including the first lens group and the second lens group, and the film plane. In this manner, it is possible to design the synthesized cam groove that is created by combining two cam grooves and is capable of partial common use.

In addition, as a correction method of each cam groove at the time of designing this synthesized cam groove, there is also a method for correcting each cam groove by placing the telescopic position of the cam groove 305 on the cam groove 304, and using the feed of the wide-angle side of the second cam tube 60 and the feed of the wide-angle side of the cam groove 305. Furthermore, there are various combined methods such as a method for correcting by means of both the wide-angle side and the telescopic side of the second cam tube 60 and both the wide-angle side and the telescopic side of the cam grooves 304 and 305.

The cam groove 63b1, 63b2, 63b3 of the second cam tube 60 shown in FIG. 5 is a guide cam for assembly at the time when the cam pins 81a, 81b, and 81c of the zoom tube 80 are fitted in the second cam tube 60.

An assembling method of the respective cam pins will be described using the cam pins 71a and 71b as examples. The cam pins 71a and 81a are inserted from the cam groove $63c_1$ of the second cam tube 60, and thereafter the cam pin 71a is moved along the cam groove $63a_1$ while the cam pin 81a is moved along the cam groove $63b_1$. The cam pin 71a moves to the position $71a_w$ on the cam groove $63a_1$ while the cam pin 81a changes from the cam groove $63b_1$ to the cam groove $63a_2$ and moves to the position $81a_w$, and they are assembled at the wide-angle positions in use.

In this invention, it is apparent that working modes different in a wide range can be formed on the basis of this invention without departing from the spirit and scope of the invention. This invention is not restricted by any specific embodiment except being limited by the appended claims.

What is claimed is:

1. A zoom lens barrel that performs zooming by moving a plurality of lens groups in a direction of an optical axis by interlocking said lens groups with each other, said zoom lens barrel comprising:

a first frame supporting a first lens group;

a second frame supporting a second lens group;

a cam tube supporting said first frame and said second frames, wherein said first frame and said second frame, can relatively move in said direction of said optical axis; and a drive cam provided in said cam tube, said drive cam having a cam that has a first cam region for moving said first frame in said direction of said optical axis and a second cam region for moving said second frame in said direction of said optical axis, wherein said first frame and said second frame commonly use partial regions of said first cam region and said second cam region at the time of performing said zooming.

2. A zoom lens barrel that performs zooming by moving a plurality of lens group in a direction of an optical axis by interlocking said lens groups with each other, said zoom lens barrel comprising:

a first frame supporting a first lens group;

a second frame supporting a second lens group;

a first cam tube having a first cam engaging said first frame and a second cam engaging said second frame, wherein said first frame and said second frame can relatively move in said direction of said optical axis;

a second cam tube having a third cam by which said second cam tube moves back and forth said first cam tube in said direction of said optical axis; and a drive cam formed in said first cam tube and coupling said first cam and said second cam, wherein said first frame and said second frame can commonly use said drive cam, whereby, on the basis of operation of said first cam tube and said second cam tube, zooming is performed by relatively moving said first frame and said second frame in the direction of the optical axis.

3. A zoom lens barrel that performs zooming by moving a plurality of lens groups in a direction of an optical axis by interlocking said lens groups with each other, said zoom lens barrel comprising:

a first frame supporting a first lens group;

a second frame supporting a second lens group;

a first cam tube having a first cam engaging said first frame and a second cam engaging said second frame, wherein said first cam tube supports said first frame and said second frame so that said first frame and said second frame can relatively move in said direction of said optical axis; and a second cam tube having a second cam by which said second cam tube moves back and forth said first cam tube in said direction of said optical axis, wherein said first cam and said second cam, which are provided in said first cam tube, are formed as a continuous cam, a portion of said continuous cam being combined and commonly used by both of said first and second frames.

4. A zoom lens barrel that is capable of zooming by moving at least two lens groups, which constitute a photo-taking optical system, in the direction of an optical axis by interlocking said at least two lens groups with each other, said zoom lens barrel comprising:

a first frame supporting a first lens group;

a second frame supporting a second lens group for supporting the second lens group; and a drive cam having first, second, and third regions that are continuous, wherein, at the time of zooming, said first region and said second region move said first frame in said direction of said optical axis, and said second region and said third region move said second frame in said direction of said optical axis.

5. The zoom lens barrel according to claim 4, further comprising:

a correction means for correcting a relative travel of said first frame and said second frame in said second region.

6. The zoom lens barrel according to claim 4, further comprising:

a first cam tube that includes said drive cam and supports said first frame and said second frame supporting the second lens group so that said first frame and said second frame can relatively move in said direction of said optical axis; and a second cam tube having a second cam which moves back and forth said first cam tube, said first frame and said second frame as a one-piece in the direction of the optical axis, whereby, on the basis of operation of said first cam tube and said second cam tube, zooming is performed by moving said first frame and said second frame in the direction of the optical axis.

7. The zoom lens barrel according to claim 6, further comprising ;

a correction means for correcting a relative travel of said first frame and said second frame in said second region.

8. The zoom lens barrel according to claim 7, wherein said correction means corrects part of the cam of said second cam tube, and part of the first and/or second region of the first cam tube.

9. A zoom lens barrel that performs zooming by relatively moving at least a first lens group and a second lens group, which constitute a photo-taking optical system, in a direction of an optical axis, said zoom lens barrel comprising:

a first frame supporting said first lens group;

a second frame supporting said second lens group;

a space maintaining means that has a cam having first, second, and third regions that are continuous and can be engaged with said first and second frames, said space maintaining means for moving said first frame by said first region and said second region and for moving said second frame by said second region and said third region in said direction of said optical axis according to said zooming operation, whereby said space maintaining means changes a space in said direction of said optical axis between said first frame and said second frame, and is formed so that said space between said first frame and said second frame becomes a predetermined length according to the zooming when said first frame is in said second region that is a common region;

a one-piece moving means moving said first frame and said second frame as a one-piece in said direction of said optical axis according to said zooming operation within a predetermined range; and a correction means that corrects an erroneous amount of space between said first and second lens groups and a film plane in said second region, which is caused by said space maintaining means, and corrects positions of said first frame and said second frame so that said positions may become positions corresponding to said zooming operation within the predetermined range.

10. The zoom lens barrel according to claim 9, wherein said correction means corrects by a travel of said first and second frames which are moved as said one piece by said one-piece moving means, and by a travel of said second frame, which is transferred by said third region of said space maintaining means, when said first frame is in said second region.

11. A zoom lens barrel that has a zoom lens having at least two lens groups that are moved in a direction of an optical axis, said zoom lens barrel comprising:

a cam member that has a first cam portion having a first region for driving one of said lens groups in said direction of said optical axis so as to change a focus length of said zoom lens and a second cam portion having a second region for driving another of said lens groups in said direction of the said optical axis so as to change said focus length of said zoom lens, wherein a part of an end of each of said first and second regions of said first and second cam portions are superimposed on each other.

12. The zoom lens barrel according to claim 11, further comprising:

a correction cam portion that is provided in said cam member and corrects one of another end of said first cam portion or another end of said second cam portion in said direction of said optical axis so as to correct a space error of said at least two lens groups that is caused by said superimposition.

13. The zoom lens barrel according to claim 12, further comprising:

a second cam member having a third cam portion so as to move said cam member in said direction of said optical axis; and a second correction cam portion which is provided in an end of said third cam portion so as to correct positions of said at least two lens groups in said optical axis that is caused by said correction cam portion.

* * * * *